Aug. 4, 1942.  C. J. CRANE  2,291,610
ENGINE AND FLIGHT FACTOR INDICATOR
Filed April 17, 1940   3 Sheets-Sheet 1
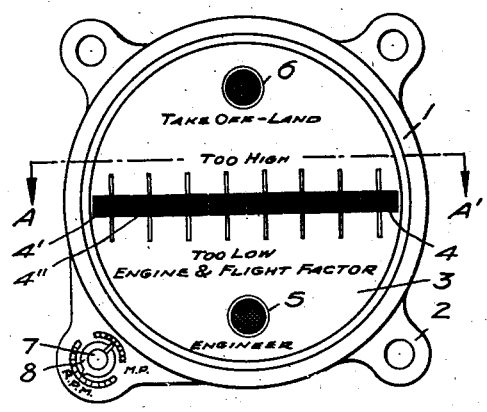
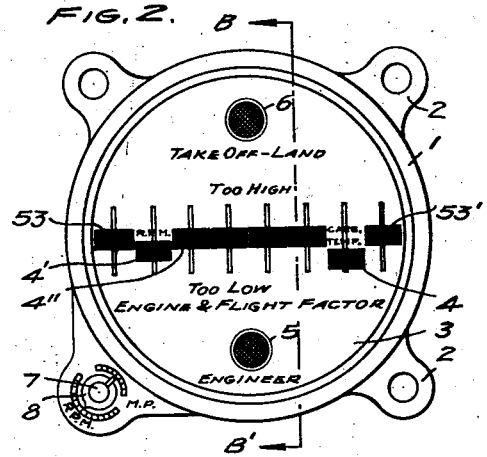
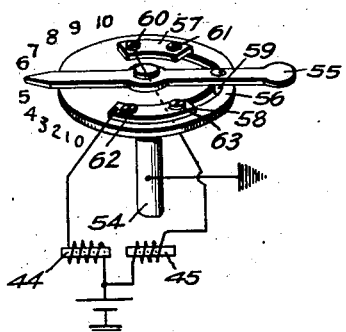
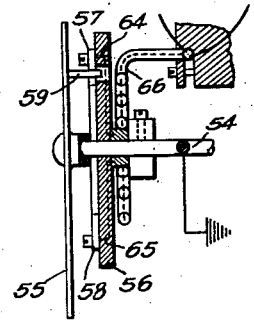
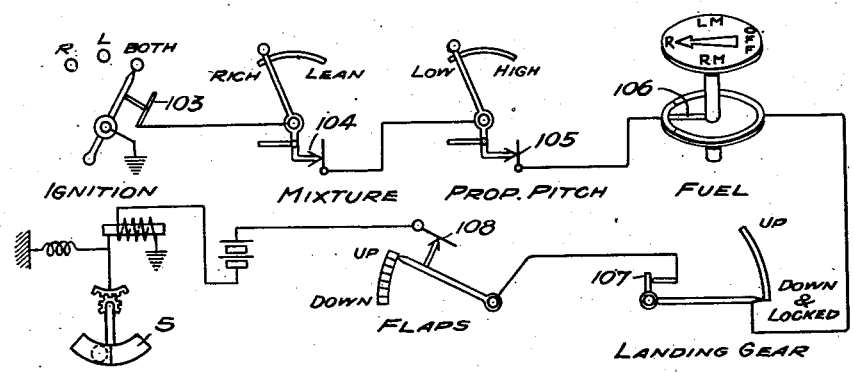
INVENTOR
CARL J. CRANE
BY
ATTORNEYS Aug. 4, 1942.  C. J. CRANE  2,291,610
ENGINE AND FLIGHT FACTOR INDICATOR
Filed April 17, 1940  3 Sheets-Sheet 2

INVENTOR
CARL J. CRANE
BY
ATTORNEYS

Aug. 4, 1942.         C. J. CRANE         2,291,610
ENGINE AND FLIGHT FACTOR INDICATOR
Filed April 17, 1940         3 Sheets-Sheet 3

INVENTOR
CARL J. CRANE
BY
ATTORNEYS

Patented Aug. 4, 1942

2,291,610

UNITED STATES PATENT OFFICE 2,291,610

ENGINE AND FLIGHT FACTOR INDICATOR

Carl J. Crane, Dayton, Ohio

Application April 17, 1940, Serial No. 330,119

9 Claims. (Cl. 177—311)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to aircraft instruments and more particularly to one which indicates by a simplified dial arrangement the functioning characteristics of the various engine elements such as temperatures, pressures, speeds, et cetera, as well as presenting information or warning of the proper or improper adjustment of certain flight controls such as flaps, propeller pitch, landing gear, et cetera.

It is well known that for many years effort has been made to supply the airman with some grouping of engine or other instruments which would allow of ready and efficient interpretation of the instruments. Many arrangements of existing instruments were tried and the design of the instruments were even changed from the familiar round type to the so-called vertical type to provide an arrangement of indicators easy to read and quick to interpret. That no full measure of success met these efforts is attested by a return to the round type instruments, the increasing number of which in the modern airplane, has presented serious problems for the airman who must quickly evaluate a large number of instrument indications.

One of the objects of this invention is therefore to provide a novel and compact indicator which indicates at a glance the condition of all the engine and essential flight factors and shows whether these factors are within the normal allowable limits for satisfactory and safe operation of the airplane.

Another object of the invention is to provide a novel combination of elements for indicating the many components relating to engine fluid pressures, temperatures, speeds of rotation, et cetera, in a manner devoid of confusion and free from probable oversight.

Another object is to make provision for a novel optical combination means of presenting essential information of engine factors and airplane control factors prior to and during take-off, during flight and prior to and during the landing in such a manner that advantage is taken of the simple geometric figure of a straight line, and one or more colored areas, to impart the necessary information relating to the engine and flight factors that must be clearly and rapidly interpreted by the airman.

Another object of the invention is to convey promptly the malfunction of any given engine or flight factor by showing a break in the simple geometric figure of the straight line, and while so doing to uncover words identifying that factor which is at fault and whether its value is above or below the permitted limits.

Another object of the invention is to provide a novel means for setting certain selected groups of the indices or indicating tabs in such a manner that selected values of the engine factors, such as speed and manifold pressure, may be immediately applied by the airman as changes are required and yet be able to maintain the simple geometry of the indicating face of the indicator.

Another object of the invention is to provide a multiplicity of pointers, which under normal conditions form only one pointer, in one instrument for indicating related factors without resorting to the old and annoying expedient of switchboard lamps or the like with their associated identifying numbers or titles, which are particularly confusing during night flight.

Another object of the invention is to provide, in an instrument of the class described, a novel engine and flight factor indicator qualitatively and quantitatively indicative of selected factors but devoid of numerals which may be mis-read and which in conventional instruments require reading to determine correct values.

The foregoing enumerated and other objects and advantages of the invention appear more fully in the detailed description to follow which, taken together with the accompanying drawings, will illustrate one embodiment of the invention. It is understood, however, that the drawings are for illustration only and not to be construed as defining the limits of the invention, reference being made for this purpose to the appended claims.

In the drawings wherein like reference characters refer to like parts in the related views:

Figure 1 is a front elevation of one form of instrument embodying the present invention, showing all engine factors within normal limits;

Figure 2 is a front elevation, in which is shown one factor, namely the carburetor temperature too low, while the indicator tab for the factor of manifold pressure is shown slightly low;

Figure 5 shows one form of switching mechanism and circuit diagram that may be used to provide the energizing of suitable circuits when either the selected upper or lower limits of the engine factor have been reached.

Figure 6 shows a sectionalized view of the switching mechanism of Figure 5 in which the dual hair-spring electric conductor is shown.

Figure 7 is a circuit diagram and mechanism for depicting the flight factor indicator operation the latter forming a part of the present invention.

Figure 3:
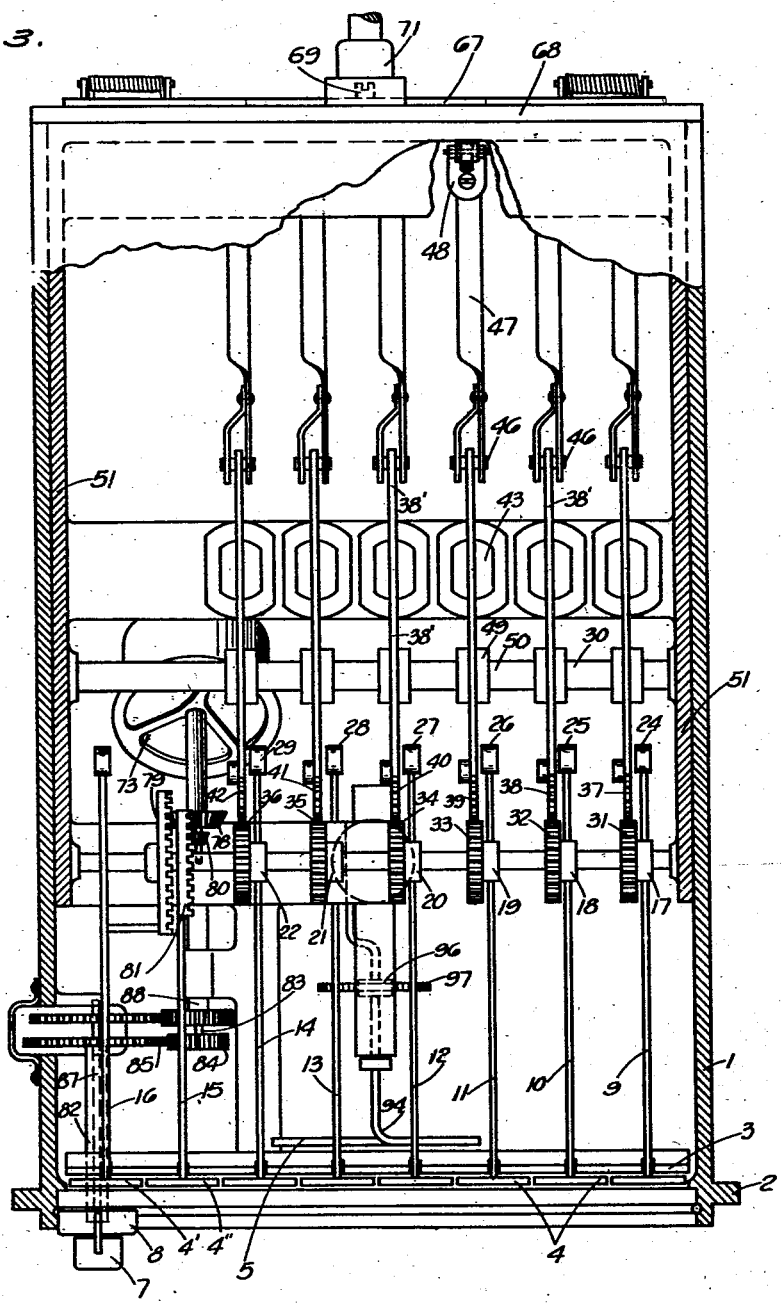
Figure 3 is a sectionalized plan view of the invention, the section being taken substantially along the line AA' of Figure 1 and shows the internal means used to accomplish the particular arrangement of the indicating pointers or tabs.

As described in the objects or purposes of the present invention there are provided two internal setting adjustments for the engine factors of manifold pressure and engine speed. While these latter two are the only factors provided, in the present preferred form of the invention with external setting knobs, it should be clear that other selected factors may be provided with external adjusting or setting knobs so that during flight a change may be made in the precise value of a particular engine factor to which it is desired to adhere. As will also be described in greater detail in that which follows it should be noted that the two factors of manifold pressure and engine speed (revolutions per minute) are represented in the preferred form, as shown in the drawings, with precise values for the alignment of their respective tabs or pointers. Minor deviations therefore in manifold pressure or engine speed will produce minor displacement of the tabs or pointers.

Referring now to the drawings it will be seen that the invention consists essentially of a novel type of indicating instrument. However, in order to explain and define the complete manner of operation of the novel indicator reference is made to well known electric circuits and switching means to serve the novel and effective indicator of engine and flight factors.

In the drawings, particularly in Figures 1 to 4 inclusive, it is seen that the novel indicator consists of the conventional cylindrically shaped case 1, provided with the usual mounting lugs 2, in order that the instrument may be fastened to the instrument board (not shown) of the airplane. A dial 3, preferably painted black (except for necessary lettering) serves as a background for the tabs or indicating pointers 4 eight of which are shown in the drawings positioned adjacent to each other in such manner that they present in normal alignment an unbroken line, contrasting in coloration, with the dial background 3, as shown in Figure 1.

The striking simplicity of this novel arrangement (Figure 1) for portraying the information that all engine factors are within normal limits, is immediately apparent and it should also be apparent that this conclusion can be arrived at in the most brief interval of time devoted to visual reference of the indicator.

In Figure 2 is shown the striking effect produced by a departure from the pre-selected value of two of the engine factors. Obviously, only a momentary inspection of the indicator is necessary for the eye to detect the break in the straight line of Figure 1.

Shielded behind the dial 3, are two semaphore or signal tabs 5 and 6 which serve as warning units, being colored red and green in such a manner as to show green when all flight factors, such as flaps, propeller pitch, landing gear, et cetera, are properly positioned for either the take-off or the landing. Normally those flight factors for which the pilot is responsible prior to take-off or landing are coupled electrically to the semaphore 6 (in the preferred form of the invention) while those for which the flight engineer is responsible are coupled to the semaphore 5. In Figure 7 is shown, diagrammatically, the means by which the semaphore is caused to operate and this operation will be hereinafter described in greater detail.

The adjusting knob 7 furnishes an exterior means for pre-selecting an engine factor, say manifold pressure while the knob 8 provides similar means for pre-selecting the engine factor of speed.

Figure 4:
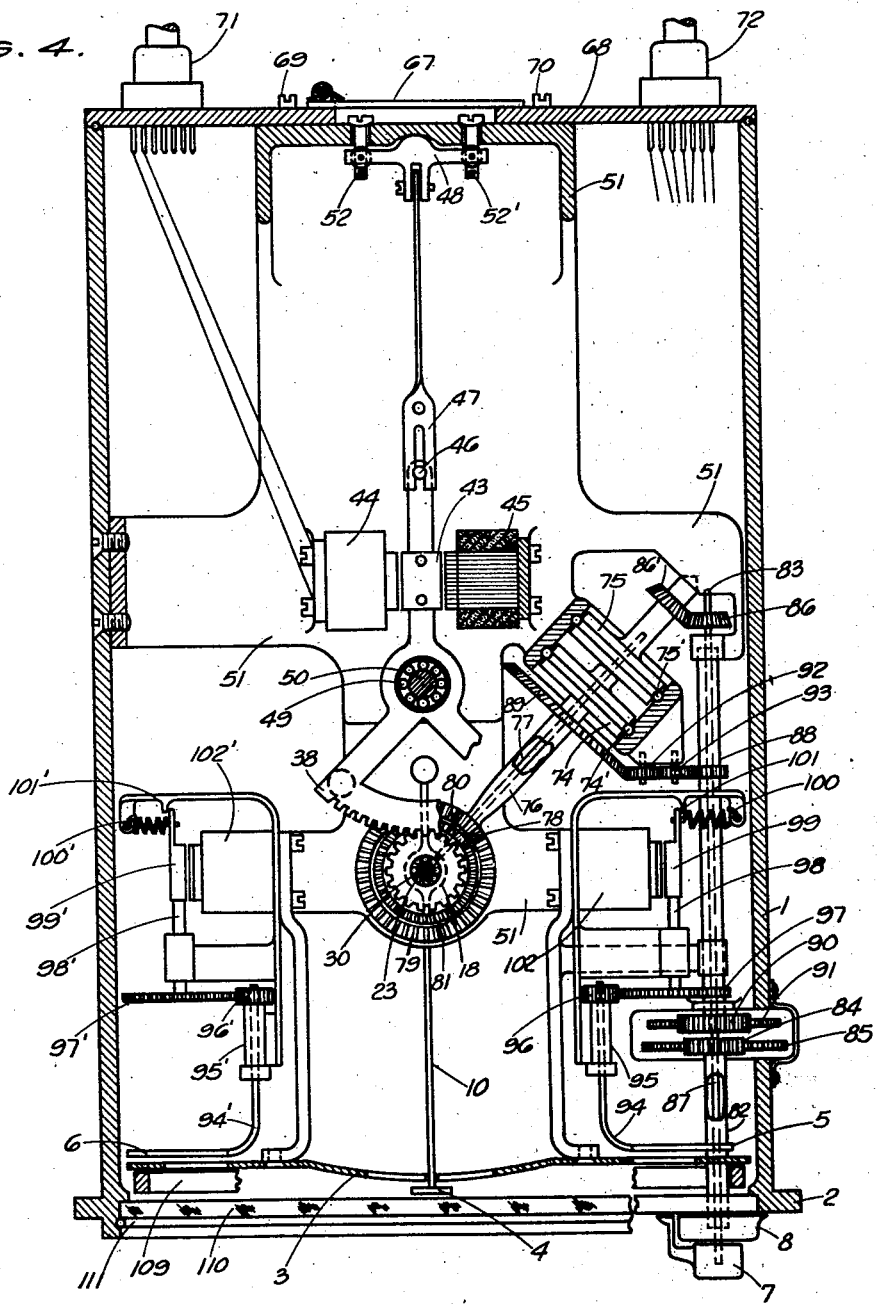
Figure 4 is a sectionalized side elevation of the invention, the section being taken substantially on the line BB' of Figure 2.

Reference will now be made particularly to Figure 3 and Figure 4 in which it will be evident that the tabs or pointers 4 are alike in essential conformity and, while in the preferred form of the invention, are shown as rectangular, in order to present a broad, smooth line, the tabs might also be circular, diamond shaped or have some other form without departing from the essential utility of that alignment as shown in Figure 1.

In Figure 3 the tabs 4 are fastened to pointer staffs 9, 10, 11, 12, 13, 14, 15 and 16. The staffs 9 to 14 inclusive are alike in essential structure being formed of some fine wall tubing or solid wire such as aluminum or copper. These staffs are in turn fixed to suitable hubs 17, 18, 19, 20, 21 and 22 respectively, the latter being fitted with suitable anti-friction bearings such as ball bearings 23 of Figure 4. Each of the hubs 17 to 22 inclusive, is provided with a rearward extension of the tab staffs the purpose of which is to support the counterweights 24, 25, 26, 27, 28 and 29. The purpose of these latter is to statically balance the tab and tab staff about the shaft 30 which is the common support and axis of rotation of the tab and its staff.

Forming an integral part of the hubs 17, 18, 19, 20, 21 and 22 are gears 31, 32, 33, 34, 35 and 36 which engage with the gear sectors 37, 38, 39, 40, 41 and 42 respectively. Each of the latter several gear sectors, represented in Figure 4 by 38 forms an integral part of the several rocker sectors each of which is fitted with an armature 43 (Figure 4) which may be attracted by the associated magnet 44 or 45 to produce respectively a high or low movement of the indicating tab 4 as may result from the operation of an abnormally high or low engine factor corresponding to the particular tab.

The rearwardly extending tip of each rocker sector is provided with a pin 46 which engages a cantilever centralizing spring 47, the latter being positioned in the centralizing bracket 48. Each rocker sector is provided with an anti-friction bearing 49. The several rocker sectors with their associated bearings are mounted for limited rotation about the shaft 50 the ends of which are positioned in the articulated frame 51 which latter also forms a support for the outer shell or case 2 of the instrument.

The rearmost position of the articulated frame 51 is slightly recessed to receive the several centralizing brackets represented by 48 of Figures 3 and 4. The centralizing brackets are provided with adjusting bolt and nut assembly 52 and 52' of well known toggle design, the purpose of which is to provide a precise adjusting means for alignment of the several indicating tabs which combined in visual association, form, under normal engine operation condition, a linear conformation facile of interpretation.

The cantilever centralizing spring 47 is arranged as shown in Figure 3 to engage the pin 46 of the rocker sectors 38' in such a manner that changes of the adjusting bolt and nut assemblies will produce proportionate changes in the tab setting and the consequent result of correct alignment of the associated tabs.

In order to understand the manner of controlling the tabs 4 reference is made to Figure 6 in which 54 represents the shaft of, for example, the oil pressure gauge of well known Bourdon tube type. This gauge is fitted with the switching mechanism shown in Figures 5 and 6 but it should be understood that only one of the many switching mechanisms known to the art may be utilized to provide a single pole double throw switch which may be adapted to work in cooperation with the present invention, the switching means being associated with the several engine gauges or indicators now customarily used to indicate engine factors.

The shaft 54 (Figures 5 and 6) which mounts the pointer 55 also supports the telltale disc 56. This disc is preferably made of some insulating material such as Bakelite and is mounted for limited rotation about the shaft 54. The limits of this rotation are fixed by the telltale disc stop plates 57 and 58 which engage the stop pin 59 of the pointer 55 when the values of the particular engine factor become either too high or too low. The stop plates 57 and 58 are constructed of some electrical conductive material such as brass or copper and when fastened in position in the telltale plate 56 by the screws 60, 61, 62, and 63 make electric contact with the imbedded conductor 64 and 65 of the telltale plate. These latter conductors extended, form the dual hairspring 66 by means of which, the electric circuit shown diagrammatically in Figure 5 is completed to energize the electro-magnets 44 and 45 (Figures 4 and 5) which in turn actuate the tabs 4 through the means already described. The dual hairspring 66 is properly insulated with some insulating material such as enamel so that its double conductor will permit only the energization of one of the magnets 44 and 45 at a time.

To insure ready adjustment of the centralizing brackets 48 a hinged snap cover 67 is provided to give access to the adjusting toggles 52 and 52'. The cover 67 is fastened to the back cover 68 of the instrument case. The back cover 68 of the case is fastened to the articulated frame 51 by the screws 69 and 70.

Connector plugs 71 and 72 of well known design furnish means for coupling the conductors leading from the instrument case to the engine factor switching mechanisms and/or to the flight factor switching mechanisms (Figure 7). For convenience space is provided to the rear of the upper and the lower banks of electro-magnets (Figures 3 and 4) for coiling or otherwise packing the wires (not shown) leading from the prongs of the electric plugs 71 and 72 to the electro-magnets and the "selsyn" or "autosyn" motors within the instrument case.

The tabs 4' and 4" as shown in Figures 1 to 3, inclusive, are connected in a different manner to their actuating mechanism, than has been described for the tabs 4. The tabs 4' and 4" indicate, in the preferred form of this invention, revolutions per minute (R. P. M.) of the engine, and manifold pressure (in inches of mercury) respectively. The tabs themselves indicate the departure from preselected values of engine speed and manifold pressure by rising above or falling below the normal operation tab alignment which is determined by the tab indices 53 and 53'.

In order to understand the manner of controlling the tabs reference is made to Figure 4 in which the dual "autosyn" or "selsyn" motor unit 73 (Figure 3) which consists of two motors 74 and 75 is of conventional and well understood construction, either of the alternating current or direct current type. As is well known the indications of aircraft instruments (or other types of indicators) may be transmitted by means of "selsyn" or "autosyn" synchronous motors. In the present invention the two engine factors of speed and manifold pressure have been selected as those two the indicating tabs of which will be actuated by the "autosyn" receivers or indicating units 74 and 75. In the conventional "autosyn" indicator, say of the tachometer type, the case of the instrument houses the motor to the shaft of which is attached a suitable pointer. The shaft of the indicator rotates in substantial unison with the shaft of the tachometer to which is attached the "autosyn" transmitting motor. So in the present invention the shaft 76 of the "autosyn" 74 rotates in substantial unison with an "autosyn" transmitter shaft attached to a suitable manifold pressure gauge (not shown), while shaft 77 of the "autosyn" 75 rotates in substantial unison with an "autosyn" attached to a suitable tachometer (not shown). The end of the shaft 76 is fitted with a bevel pinion 78 which engages the bevel gear 79 to which is attached the pointer staff 16 the end of which terminates in the tab 4'. The end of the shaft 77 is fitted with a bevel pinion 80 which engages the bevel gear 81 to which is attached the pointer staff 15 the end of which terminates in the tab 4". It should therefore be obvious that the motion of a tachometer indicating shaft and of a manifold pressure gauge shaft (neither shown) will impart movement, substantially smooth and uniform to the tabs 4' and 4".

Since however values of engine speed and manifold pressure are usually maintained at precise values during flight and are frequently shifted from one precise value to another during flight (unlike oil pressure, or fuel pressure or oil temperature) it is desirable that the tabs 4' and 4" representing these two engine factors be susceptible of setting to alignment with the normal tab alignment irrespective of the precise value chosen. In order that this may be accomplished the "autosyn" indicators 74 and 75 have their individual and respective cases fitted with ball bearings or the like as shown at 74' and 75' providing thereby an arrangement whereby the rotation of the "autosyn" case will also impart a displacement of the corresponding tabs 4' and 4". In other words, and by reference to Figure 1, all tabs are seen to be in the normal position such as might be the case during flight in which all engine factors are within normal limits and the engine speed and manifold pressure are exactly set to pre-selected values. Figure 2 shows tab 4" slightly low. This may be corrected by either increasing the engine speed, or by turning the knob 8. If the knob 8 is turned, its associated shafts 82 and 83 working thru the gears 84 and 85 impart rotation to the "autosyn" case 75 by means of the bevel gears 86 and 86'. Since, of course, rotation of the case 75 (with no simultaneous adjustment of engine speed) imparts rotation to its associated shaft 77 the result will be an associated movement of the tab 4".

In like manner a turning of the knob 7 will impart an adjustment to the tab 4'. The knob 7 with its associated shafts 87 and 88, will if rotated, cause the proportionate rotation of the bevel gear 89 and its "autosyn" unit 74. The gears 90, 91, 92 and 93 are idler gears.

As previously stated the invention embodies two semaphores 5 and 6 which provide a bi-color signal for the flight (principally) factors shown diagrammatically in Figure 7. The semaphore 5 is preferably constructed of some light material such as aluminum and colored partly red and partly green as shown in Figure 7. To the semaphore is attached an arm 94 which is suitably mounted in a bearing 95. The tip of the arm is provided with a pinion 96 which engages a gear 97. The gear 97 is attached to the armature shaft 98 of the armature 99 the latter being loaded with the coil spring 100 to hold the armature extension against the stop 101 which can only be so held if the electro-magnet 102 is not energized by the complete closing of the circuit shown in Figure 7. Any one of the several switches 103 to 108 inclusive if left open will permit the spring 100 to keep the armature in the position shown and so rotate the semaphore 5 to present a red coloration to the airman thereby warning of an incorrect setting of one or more of the flight factors. In like manner to that described for semaphore 5 the semaphore 6 is constructed and operated. It may be operatively connected to other flight, bombing, photographic or engine factors, that require a warning signal imparted to the pilot.

The glass or "lucite" ring 109 is arranged in accordance with customary practice to provide illumination for the dial and indices. The cover glass 110 is held in position by the snap ring 111.

Although only one embodiment of the invention has been illustrated and described, various changes and modifications in the form and relative arrangement of the parts, which now appear to those skilled in the art may be made without departing from the scope of the invention.

Reference is now made to the appended claims for a definition of the limits of the invention.

I claim:

1. In an indicator and signal device of the character described, a plurality of visible indicators arranged in parallel spaced relation for movement about a common axis relative to a dial, means for retaining each of said indicators in a normal neutral position such that said indicators are aligned to present a visible unbroken horizontal straight line, and means operatively associated with each of said indicators to displace the same from said neutral position in a direction indicative of the departure of the factor indicated thereby from a predetermined range of values corresponding to the neutral position of said indicator, the departure of any one of said indicators from the neutral position causing a peak in said visible line to thereby indicate the departure of the associated factor from the desired condition.

2. The structure as claimed in claim 1, in which said dial is provided with indicia indicative of the factor represented by each indicator, each of said indicia being obscured from view by a respective indicator when the latter is in the neutral position and rendered visible upon movement of said indicator in either direction from the neutral position.

3. An indicating instrument for indicating the departure of engine operation factors from a predetermined desired range, comprising a plurality of master indicator devices each movable in accordance with the instant value of a respective engine factor, a plurality of spaced parallel indicator elements movable about a common axis relative to a dial and normally maintained in a neutral position such that said indicators present a visible unbroken horizontal line, and means respectively associated with each indicator and connected to a particular one of said master indicator devices for deflecting the associated indicator from said neutral position in a direction indicative of the change in position of said master indicator device from a predetermined range of movement corresponding to the neutral position of the associated indicator element, whereby the break in the optical continuity of said visible line indicates the character of the change in a particular engine factor from a desired range of values.

4. The structure as claimed in claim 3, in which said dial is provided with indicia associated with each respective indicator to identify the particular engine factor indicated thereby, said indicia being arranged to be covered by said indicators when the latter are in the neutral position and rendered visible upon the deflection of the associated indicator in either direction from the neutral position.

5. In a signalling device of the character described, a plurality of movable contact arms each angularly movable in accordance with the variation in a factor to be indicated, a pair of spaced contacts associated with each respective arm and engaged thereby upon a predetermined angular displacement of said arm, a plurality of indicator signal elements arranged in parallel spaced relation for movement about a common axis relative to a reference background, individual means associated with each indicator for maintaining the same in a predetermined neutral position such that all of said indicators when in the neutral position present a visible unbroken horizontal line across said background, individual electromagnetic means associated with each of said indicators and operative to deflect the indicator in either direction from said neutral position, and electrical circuits connecting respective pairs of said contacts with respective ones of said electromagnetic means to cause actuation of the respective indicators from the neutral position to cause a peak in said visible line in a direction dependent upon the engagement of one of said contacts with its associated contact arm.

6. The structure as claimed in claim 5, in which said background is provided with indicia corresponding to the factors associated with the respective indicators, said indicia being located so as to be hidden from view when the associated indicators are in the neutral position but rendered respectively visible when the associated indicator is deflected from the neutral position.

7. In a device for indicating the safe operation of a power plant, an instrument casing, a background dial in said casing, a plurality of indicia on said dial each identifying a particular power plant operating factor, said indicia being arranged in horizontal alignment across the face of said background, a plurality of annunciator shields movable about a common axis relative to said dial, yielding means associated with each shield to normally maintain said shields in horizontal alignment in a neutral position presenting a substantially unbroken visible line across said dial covering said indicia, and electromagnetic means associated with each respective shield for deflecting the same above or below the neutral position to cause an optical discontinuity in said visible line to indicate the presence and character of a change of a particular power plant factor from a predetermined maximum or minimum safe value.

8. An aircraft power plant indicating instrument for simultaneously indicating the concurrence or divergence of respective power plant operation factors from a desired value or range of values; comprising a single casing having a slotted background screen, a plurality of parallel indicator arms independently movable about a common axis and each extending through a respective slot in said screen, visible indicating tabs each mounted on the end of a respective one of said arms, said tabs being aligned in a neutral position of said arms to present a continuous visible horizontal line across said background screen, means associated with certain of said arms for deflecting the same from the said neutral position in a direction indicative of the variation in the respective power plant factors from the desired value or range of values and to thereby interrupt the optical continuity of said line, and a receiver associated with at least one other of said indicator arms operative to position said arm in accordance with the instant value of another power plant factor such as engine speed, and manual setting means for rotating said receiver and the indicator arm associated therewith as a unit so that the tab on the latter indicator arm may be brought into visual alignment with the normal positon of the other of said tabs for a desired value of the engine speed factor.

9. In an indicating instrument of the character described, a casing having a slotted reference screen therein, a plurality of indicator arms in said casing movable about a common axis and each extending through a respective slot in said screen, a tab mounted on each of said indicator arms and adapted to form a continuous unbroken horizontal visible line when in a neutral position corresponding to a selected safe value of the respective factors to be indicated, a receiver associated with each indicator arm and adapted to angularly position the indicator arm in accordance with the instant value of a respective factor to be indicated and means for manually rotating each of said receivers and indicator arms as a unit to position said tabs in horizontal alignment for any selected value of the factor to be indicated by each respective tab when in the said neutral position, the movement of a tab in either direction from the neutral position interrupting the optical continuity of the said visible line and causing a peak on either side of the said line indicative of the direction of the departure of the particular factor from the desired value.

CARL J. CRANE.